United States Patent [19]

Habich

[11] Patent Number: 4,973,065
[45] Date of Patent: Nov. 27, 1990

[54] SEAL ASSEMBLY

[75] Inventor: Michael P. Habich, North Reading, Mass.

[73] Assignee: A. W. Chesterton Company, Stoneham, Mass.

[21] Appl. No.: 424,661

[22] Filed: Oct. 20, 1989

[51] Int. Cl.$^5$ .................... F16J 15/34; F16J 15/38
[52] U.S. Cl. ................................ 277/087; 277/85; 277/93 SD
[58] Field of Search ............ 277/93 SD, 81 R, 93 R, 277/96, 96.2, 38, 26, 82, 85, 116.2, 116.8, 117, 188 A, 188 R, 87

[56] References Cited

U.S. PATENT DOCUMENTS

| | | |
|---|---|---|
| 1,936,815 | 11/1933 | Wilkinson . |
| 3,222,075 | 12/1965 | Haeber . |
| 3,294,408 | 12/1966 | Smith . |
| 3,591,188 | 7/1971 | Eisner . |
| 3,675,933 | 7/1972 | Nappe . |
| 3,727,923 | 4/1973 | McEwen . |
| 3,773,337 | 11/1973 | Adams . |
| 4,008,897 | 2/1977 | Wentworth . |
| 4,136,887 | 1/1979 | Wentworth . |
| 4,184,689 | 1/1980 | Brodell . |
| 4,343,477 | 8/1982 | Bridges . |
| 4,349,205 | 9/1982 | McGee . |
| 4,364,571 | 12/1982 | Hershey . |

OTHER PUBLICATIONS

Taylor, NASA Technical Briefs, pp. 69-70, Circle Reader Action No. 475, LAR-13435, (May 1987).

Primary Examiner—Allan N. Shoap
Assistant Examiner—Daniel G. DePumpo

[57] ABSTRACT

A seal assembly for sealing about an axis of rotation has a pair of seal rings relatively rotatable about the axis while in face engagement radially of the axis. One of the seal rings is yieldably pressed against the other, which is held by axially fixed clamping members at axially opposite sides thereof and has a substantially different coefficient of expansion than the clamping members. The clamping members have oppositely directed retainer surfaces annular about the axis, each paired with an opposed parallel surface on the clamped ring. Each pair of retainer and opposed surfaces is inclined at an acute angle to the other pair with its surface generatrices centered on substantially the same point on the axis as those of the other pair to minimize distortion of the radial plane of engagement of the rotary seal faces by relative expansion/contraction of the clamped ring and clamping members.

6 Claims, 3 Drawing Sheets

SEAL ASSEMBLY

BACKGROUND OF THE INVENTION

This invention relates to a seal assembly for sealing about an axis of rotation, more particularly to such an assembly which includes a pair of seal rings mounted for rotation of one relative to the other coaxially about the axis, one of the ring being yieldably pressed against the other with their opposed faces forming the seal. Commonly, the assembly is used to seal the tubular spaces between a shaft and structure surrounding the shaft, one of which, usually the shaft, is rotated about the axis, whereas the other is fixed, the seal rings being respectively connected to the shaft and to the structure to complete the sealing.

Such seal assemblies are often exposed in use to temperature extremes which cause considerable expansion or contraction of the metal or other material of which the parts are made, the amount of expansion/contraction differing with parts made of different materials having different coefficients of expansion. Expansion can be accommodated by spacing of parts which do not have to be clamped or sealed together. However, one of the seal rings needs to be clamped against displacement longitudinally of the axis under the opposed resilient pressure of the other seal ring, and normally also to be sealed to at least one clamping component. This clamped seal ring is commonly referred to as the "hard face," or "mating ring," because its seal face, and usually its entirety, is made of tungsten carbide or equivalent, which is harder than the carbon of which the resiliently pressed seal ring is normally formed and is referred to hereinafter as the "hard seal ring".

In prior art structures, the mutual, differential expansion/contraction of the clamped portion of the hard seal ring and of the clamping structure (which have substantially different coefficients of expansion/contraction in response to temperature changes) has caused serious problems, such as breakdown of the gasket sealing and-/or distortion of the seal ring so that its seal face is twisted out of the desired radial plane of engagement, with the consequence of ending, or drastically reducing, the useful life of the seal rings and/or gasketing, necessitating costly shut-down for replacement.

SUMMARY OF THE INVENTION

The present invention overcomes the aforesaid difficulties by a novel construction and interrelation of the oppositely directed, axially fixed surfaces of the clamp and the opposed surfaces on the hard seal ring.

In seal assemblies according to the invention, as in prior assemblies of the type concerned, a pair of seal rings is mounted for relative rotation about the axis; resilient means presses the seal face of the carbon ring longitudinally of the axis against the seal face of the hard seal ring in a plane radial to the axis; and axially fixed clamping means has clamping members at axially opposite sides of the hard seal ring providing oppositely directed retainer surfaces annular about the axis and each paired with an opposed surface on the hard seal ring so as stop its displacement in axially opposite directions.

However, according to the present invention, each pair of retainer and opposed surfaces is inclined at an acute angle to the other pair, with its surface generatrices centered at substantially the same point on the axis as those of the other pair. It has been discovered that this structure avoids substantial changes in the clamping pressure of the clamping means on the hard seal ring as a result of their differential expansion/contraction which, in prior art structures, have been responsible for the aforesaid difficulties experienced with prior art structures. Thus, distortion of the plane of engagement of the seal faces is prevented and the useful life of gasket seals is prolonged.

In preferred embodiments, the generatrices of the respective pairs of retainer and opposed surfaces are at an angle to each other between about 15° and 40° . Desirably, the generatrices of one of the pair are radial to the axis and the angle between them and the generatrices of the other pair is about 20° . Normally, a gasket is included between at least one of the surface pairs.

A major advantage of the invention is the ease with which existing designs can be modified to obtain its benefits, without added parts or size change.

DESCRIPTION OF THE PREFERRED EMBODIMENTS

Figure 1:
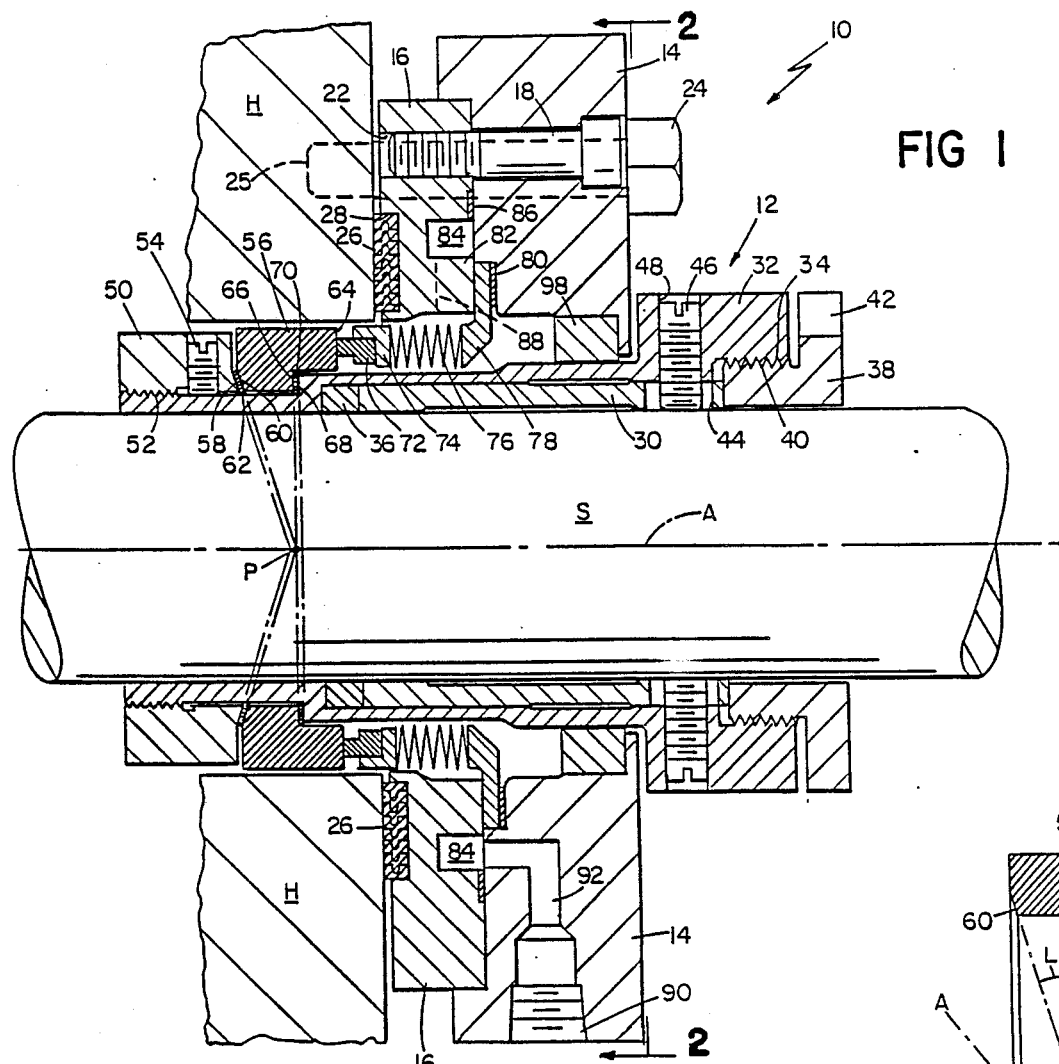
FIG. 1 is a longitudinal cross-section view on lines 1—1 of FIG. 2 of a seal assembly according to the invention, installed to seal the space between a shaft and a housing partially shown.

The embodiment of FIG. 1 is shown assembled around the axis of a shaft S to seal the space between the shaft and a housing H, such as a pump housing. The shaft S is assumed to be rotated and the housing H to be fixed, as is more usual, although the housing may be rotated and the shaft fixed.

Figure 2:
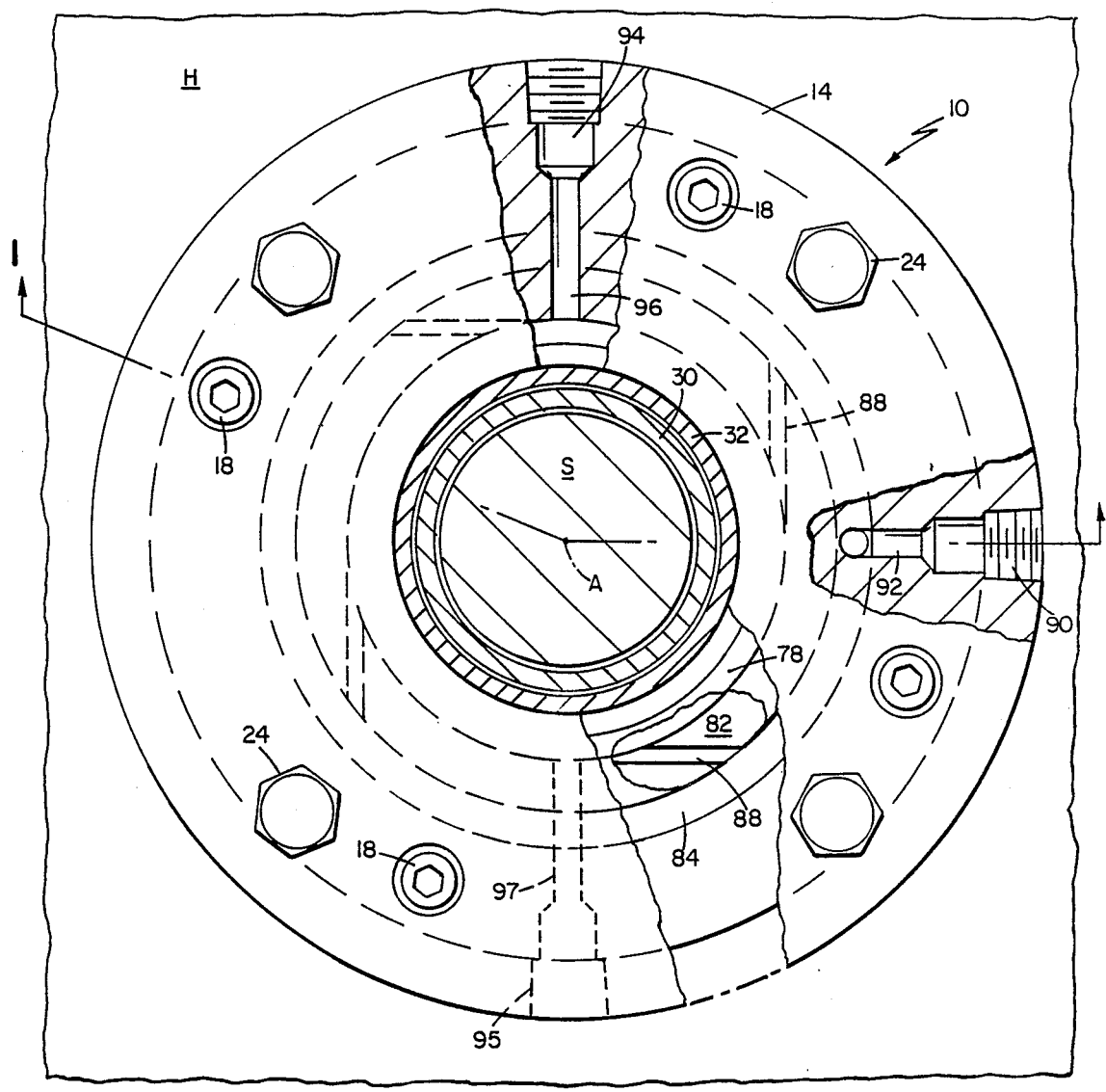
FIG. 2 is a front elevation view of the installed assembly of FIG. 1.

Referring to FIGS. 1 and 2, the seal assembly shown has two main sub-assemblies, a gland assembly designated generally 10 and a sleeve assembly designated generally 12. Gland assembly 10 includes an annular gland 14 and a separate, small diameter axial extension thereof 16, which seats in an annular recess in the gland 14, into which it is clamped by bolts 18 extending through bores in gland 14 into threaded sockets 22 in extension 16. Gland assembly 10 is bolted to housing H by bolts 24 extending through aligned apertures in gland 14 and extension 16 and received in threaded sockets 25 in housing H (dashed lines in FIG. 1). A seal 26 in an annular recess 28 in the inboard face of gland extension 16 seals the gland assembly to the housing H around the shaft S. The seal 26 shown is preferred for high temperature applications, being formed of spirally wound metal and filler strips, and being commercially available under the registered trademark Flexitallic from Flexitallic Gasket Co. Inc. of Bellmawr, N.J.

Sleeve assembly 12 has a radially inner sleeve 30 and radially outer sleeve 32. Outer sleeve 32 has a smallest diameter inboard end portion closely fitting around shaft S, a larger diameter mid portion and a still larger diameter outboard end portion provided with a screw thread 34 around its interior. A compressible graphite seal 36 closely fitting shaft S has its inboard and radially outer sides engaged by the shoulder between the inboard and mid portions of sleeve 32. Inner sleeve 30 has an inboard end closely surrounding shaft S and engaging the side of seal 36 opposite the inboard side engaged by sleeve 32.

An adjuster ring 38 has an externally screw threaded shank 40 which mates internal thread 34 on sleeve 32 and has square slots 42 in its periphery to receive a turning wrench. Shank 40, which engages the outboard end of sleeve 30, can thereby force that sleeve axially, to adjustably compress seal 36, so that it expands radially into tight sealing engagement with shaft S. Inner sleeve 30 is also provided adjacent its outboard end with a circumferential array of axially extending slots 44, through which the ends of screws 46 extend from a similar array of threaded apertures 48 in outer sleeve 32 to engage shaft S and lock the sleeves and ring 38 against rotation relative to the shaft.

A clamping ring 50 has an internal screw thread received on a screw thread 52 at the inboard end of sleeve 32. Ring 50 is non rotatably fixed to sleeve 32 by a screw 54 extended through a threaded aperture in the ring and pressing against the outer surface of sleeve 32. Ring 50 is one of the clamping members for retaining hard sealing ring 56 against inboard axial movement, by axially inclined retainer surface 58 opposed by a correspondingly inclined surface 60 on hard seal ring 56 and intervening gasket 62.

Sealing ring 56 has a radially disposed sealing face 64 which is the outboard end of an axially wider, radially outer portion of the ring. The narrower, radially inner portion of sealing ring 56 has a radially disposed surface 66 opposed to a radially disposed surface 68 on the adjacent mid-section of sleeve 32, with intervening gasket 70, to stop movement of seal ring 56 in the axially outboard direction. Thus sleeve 32 provides the second of the clamping members in its region containing retainer surface 68. The hard seal ring clamping arrangement, which the invention particularly concerns, is discussed in more detail after the complete description of the entire assembly.

The seal face 64 of hard seal ring 56 is engaged by the seal face of the carbon seal ring 72 fixed into holder 74 on one end of annular metal bellows 76. The opposite end of bellows 76 is secured to a flange ring 78 which extends into an annular depression in the face of gland 14 toward housing H where one face of it seats against gasket 80. The opposite face of flange ring 78 engages the radially inner peripheral portion 82 of the opposed face of gland extension 16, so that ring 78 and the bellows, sealing ring and holder to which it is attached, are fixedly clamped between gland 14 and extension 16 and thus to housing H.

Between inner peripheral portion 82 of gland extension 16 and its outer peripheral region is a channel 84, which has an annular seat for a gasket 86 around its outer periphery that has sealing engagement with the opposed face of gland 14. Portion 82 has generally tangential passages 88 formed therethrough (see FIG. 2).

Gland 14 has a fitting 90 in its outer periphery for connection to a source of flushing fluid, usually the same as the fluid sealed. From fitting 90 an L-shaped passage 92 opens into channel 84 (FIGS. 1 and 2). Flushing fluid admitted to fitting 90 passes through passage 92 into channel 84, thence through passages 88 into the space between the radially outer side of bellows 76 and the space between the sealing rings 56 and 72 and housing H.

Thus is provided a flush system for cleaning the unsealed, radially outer portion of the seal assembly. Such a system is particularly desirable where carbonizable fluids such as oils are present in the passage being sealed, avoiding removal of the assembly for cleaning.

Also provided in this preferred embodiment is a system for purging or quenching, with steam or other suitable fluid parts of the assembly which are sealed from the passage between the housing H and shaft S by sealing rings 56 and 72 and by gasket 70. This system includes two fittings 94, 95 in diametrically opposite portions of the periphery of gland 14 for connection, as inlet from a source of the quenching fluid and an outlet to the source or elsewhere (see FIG. 2). Radial passages 96, 97 from the respective fittings 94, 95 open into the space between gland 14 and the radially outer surface of sleeve 32, to the right of flange ring 78 in FIG. 1. Quenching fluid admitted to this space circulates between sleeve 32 and seal ring 72, with its supporting assembly 74, 76, 78, together with exposed radially inner parts of seal ring 56, to cool and cleanse these parts while the shaft and seal assembly are operative. A sealing bushing 98 set in an L-shaped annular channel in the radially inner periphery of gland 14 causes the fluid to escape from the assembly only via the outlet port 95.

Figure 3A:
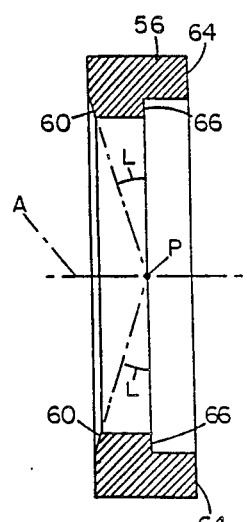
FIG. 3a is cross-section view as in FIG. 1 of the complete hard seal ring removed from the other parts of FIG. 1, with construction lines added.

Referring back now to the hard seal ring 56 and its mounting according to the invention, FIG. 3a shows a full cross-section view of this ring positioned as in FIG. 1 but with the other parts removed. As can be seen, the surface 66 of seal ring 56, opposed to retainer surface 68 on sleeve 32 in FIG. 1, is formed to lie in a plane radial to the axis A at point P. As shown by dashed construction lines, the surface 60 of this seal ring, opposed to retainer surface 58 in FIG. 1, is formed to conform to the outer part of a conical pattern generated by a generatrix line centered on the point P and rotated 360° at a selected acute angle L to the radial plane of surface 66. The included angle of the conical generatrix pattern is therefore the complement obtuse angle of the selected angle L. The retainer surfaces 58 and 68 of FIG. 1 may then be formed parallel to the respective surfaces 60 and 66 of the ring 56.

Following the above procedure, the generatrices of the retainer surfaces 58, 68 and the respective opposed seal ring surfaces 60, 66 in FIG. 1 would all be exactly centered on the same axial point P at a uniform angle to axis A if the paired surfaces were in actual contact. In FIG. 1 this is not the case because a gasket separates each pair, and usually at least one pair will have an intervening gasket. This means that the angle between the retainer surface will be slightly wider than the angle between the opposed ring surfaces by the thickness of the gasket or gaskets involved and will have its apex slightly displaced from point P and axis A, as indicated by the dashed lines in FIG. 1 from each paired surface to point P or its proximity. However, the gaskets used are so thin that the differences involved are negligible. The retainer surface 58 can be formed to the slightly larger angle and the seal ring surface 60 made parallel thereto or as just described.

Figures 3B, 3C:
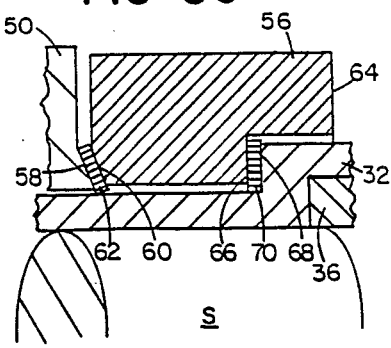
FIG. 3b is an enlargement of part of the cross-section view of FIG. 1 above the shaft, illustrating the relative positions of the hard seal ring and clamping parts at a low temperature.
FIG. 3c is a like view to FIG. 3b, illustrating the relative positions of the same parts at a high temperature.

The enlarged cross-section views of FIG. 3b and FIG. 3c, of the hard seal ring and clamping parts at the top of the shaft in FIG. 1, illustrate the changed relations of the hard seal ring and clamping parts as their temperature changes from cool to hot (FIG. 3b-cool to FIG. 3c hot) or vice-versa (FIG. 3c to FIG. 3b). The hard seal ring 56 is assumed to be made of silicon carbide (expansion coefficient $2.7 \times 10^{-6}$ in/in° F.), and the remaining parts (other than gaskets) of stainless steel (expansion coefficient $9.7 \times 10^{-6}$ in./in.° F.), as they are in the embodiment on which FIG. 1 is based. In FIGS. 3b and 3c the expansion-contraction of parts is somewhat exaggerated in order to make it more visible by assuming a greater temperature change than would normally be encountered in use.

In heating from the cool temperature of FIG. 3b, such as room temperature, to an elevated, working temperature such as represented by FIG. 3c, shaft S, being a solid cylinder, expands in outer diameter. Sleeve 32, being a hollow cylinder of similar inner diameter to the shaft and having the same coefficient of expansion, expands in inner diameter correspondingly to accommodate the radial expansion of the shaft. Similarly, clamping ring 50, having its inner surface mounted on the outer surface of sleeve 32 and having the same coefficient of expansion, expands in inner diameter correspondingly with the expansion in outer diameter of the portion of sleeve 32 to which it is attached. Axial expansion of the shaft S, sleeve 32 and clamping ring 50 are like so that these parts do not change their relative positions.

It is the difference in coefficient of expansion of the hard seal ring from that of the other clamping parts that has created the difficulties to which the present invention is addressed. As the sleeve 32 and the clamping ring 50 expand from FIG. 3b to FIG. 3c, retainer surfaces 58 and 68 are simultaneously separating due to axial expansion and growing radially due to radial expansion. However, the opposed surfaces 60 and 68, respectively, on the hard seal ring are not separating axially and growing radially by an offsetting amount but by only less than one third the same amount.

If both sets of surfaces 58, 60 and 66, 68 were radially disposed as in the prior art, it will be appreciated that the sealing pressure they impose upon the hard seal ring portion between them is progressively reduced as they separate with expansion. This results in progressively increasing looseness of the gaskets which promotes distortion forces between the hard seal ring and clamping members, growing differentially radially, that can result in distortion of the hard seal ring sealing face 64 out of its radial plane of engagement with the sealing face of the other ring 72. Furthermore, since the effects are in reverse when the assembly cools, repeated heating and cooling subjects the gaskets to repeated expansion and compression, shortening their useful life.

As can be seen from FIG. 3c, due to the angular relation between the surface 58, 60 and 66, 68, these effects are avoided. As surfaces 58 and 68 simultaneously expand radially and separate axially, their radial expansion causes them to move outwardly so that the portion of hard seal ring 56 between them, expanding outwardly much less, is brought further into the gap between these surfaces. The widening of this gap due to axial expansion is thus offset by the progressive narrowing of this gap toward the axis under the axial relation of the two sets of retainer and opposed surfaces. The pressure of the clamping means on the hard ring remains substantially uniform and, since the effect is the same in reverse in returning from hot to cool, there is no repeated expansion and compression of gaskets. Put another way, with the clamping structure of the invention, there is no significant relative motion of opposed clamping surfaces except that parallel to their opposed surfaces, while with radially disposed, opposed surfaces of the prior art, there is potentially damaging relative movement normal to the opposed surfaces.

It is important to the above that the retainer and opposed surface pairs 58, 60 and 66, 68 have their generatrices approximately concentric on the axis at a point such as P. Otherwise, the spacing of the two pairs of surfaces from each other would not vary uniformly with radial distance from the axis as it does with the concentric pairs according to the invention. This in turn means that the pressure exerted on the ring between the clamps would be uneven over the radial extent of the opposed clamping surfaces in the assumed non-concentric case, which would impair, if not destroy, the benefits of angling the surfaces according to the invention.

In selecting the angle L, which determines the extent of angularity between the surface pairs 58, 60 and 66. 68, certain factors need to be considered. One is that while the components of radial force produced by angularity have significant function in controlling the relation of parts during expansion/contraction, they do lessen the axial clamping force. Too great an angularity, such as 45° or more, could be too much, setting up undesirable circumferential stresses resulting from axial forces required to cause the gaskets to seal. Another factor is the available relative dimensions for the seal ring and clamping parts. For example, if the diameter of the shaft S in FIG. 1 was materially larger, either the axial length of the ring 56 between the clamping surface pairs would have to be increased to maintain the same angle L, or the angle L would need to be reduced. As earlier stated, the preferred angularity range is between about 15° and about 40°. About 20° has been found desirable, particularly where, as in the embodiment of FIG. 1, one of the surface pairs is disposed radially. In the embodiment on which FIG. 1 is based, the size of parts and shaft S was approximately as shown in FIG. 1 and the angle L was 21°.

Figure 4:
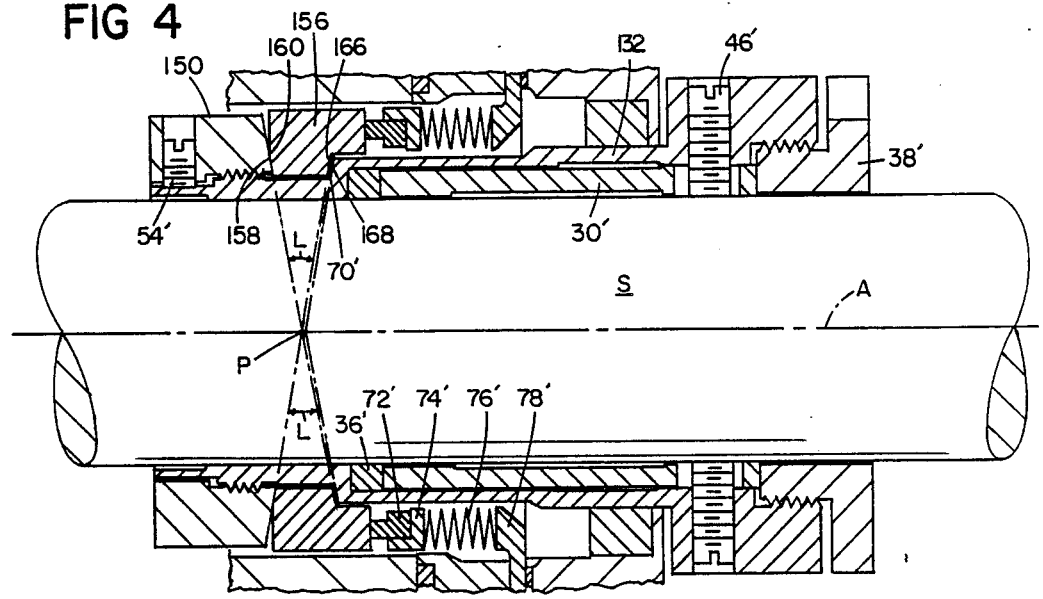
FIG. 4 is a cross-section view similar to FIG. 1 of a modification of parts shown in FIG. 1.

FIG. 4 shows a modification of the seal rings and their mounting of FIG. 1, unmodified parts bearing primes of the same numbers as they have in FIG. 1. The only modified parts of FIG. 1 are the retainer ring 50 in FIG. 1, designated 150 in FIG. 4, the hard seal ring 56 in FIG. 1, designated 156 in FIG. 4, and sleeve 32, designated 132 in FIG. 4.

In FIG. 4, sleeve 132 has been modified by changing its retainer surface 68 in FIG. 1 from radial to a retainer surface 168 which is inclined in the axial direction toward the inboard end of the assembly. The seal ring 156 has been modified to have a correspondingly inclined opposed surface 166. The gasket 62 of FIG. 1 has been omitted (as may also be done in the FIG. 1 embodiment). As indicated by the dashed line, the generatrices of both pairs of retainer and opposed surfaces are centered at approximately the same point P on the axis A.

Because these modifications move the point P longitudinally on the axis A from its position in FIG. 1, either the angularity to the axis of the other pair of retainer and opposed surfaces (retainer surface 58 in FIG. 1, 158 in FIG. 4 and opposed surface 60 in FIG. 1, 160 in FIG.

4) must be changed, or the spacing between the opposed pairs must be increased to meet the criterion of the invention that their generatrices be centered at substantially the same axial point P.

In FIG. 4 the angle of surfaces 158, 160 to axis A was made greater than the angle of the corresponding surfaces in FIG. 1 by the amount of the acute angle between surface 168 and a radial plane. Thus the angle L between the two pairs of surfaces remains the same as in FIG. 1, and the generatrices of the surfaces are approximately concentric at point P removed to the left from its position in FIG. 1, as indicated by dashed lines. In FIG. 4, gasket 70 of FIG. 1 is retained as 70' because this gasket is necessary to close the sealed side of the sealing rings from the otherwise unsealed spacing of retainer ring 150 and seal ring 156 from sleeve 132.

The effect of the modification of FIG. 4 is to provide non-radial clamping surface pairs at both axial sides of sealing ring 156, so that the clamping force exerted on the ring by both surface pairs, instead of by only one of them in FIG. 1, has radial components.

It will be appreciated that the gland assembly 10 and sleeve assembly 12, with associated parts, can be assembled together in advance of installation. To install the assembly it is only necessary to slide the entire assembly over the end of shaft S to desired position, fasten bolts 24 to the housing H, clamp sleeve 32 to shaft S by screws 46 and tighten seal 36 against shaft S by means of adjuster ring 38. The two-sleeve assembly 12 with its screws 46 external to housing H makes it possible both to install the device to, and remove it from, operative position, without having to move shaft S relative to the housing H. In addition, adjustment of the pressure between the two seal rings can be effected from outside the housing without moving the assembly relative to the housing.

However, utilization of the invention to obtain its advantages is not dependent on the particular design and nature of parts used with the hard seal ring and clamping structure to complete the assembly, nor on whether the hard seal ring is secured to the rotary shaft S and the resiliently pressed seal ring is secured to the fixed housing H, as in FIGS. 1, or vice versa. The particular features of the complete assembly of FIG. 1 are preferred for certain applications only, and, in general, the hard seal ring clamping according to the invention can be utilized with other parts of different designs for the same or other applications as may be desired or required.

Figure 5:
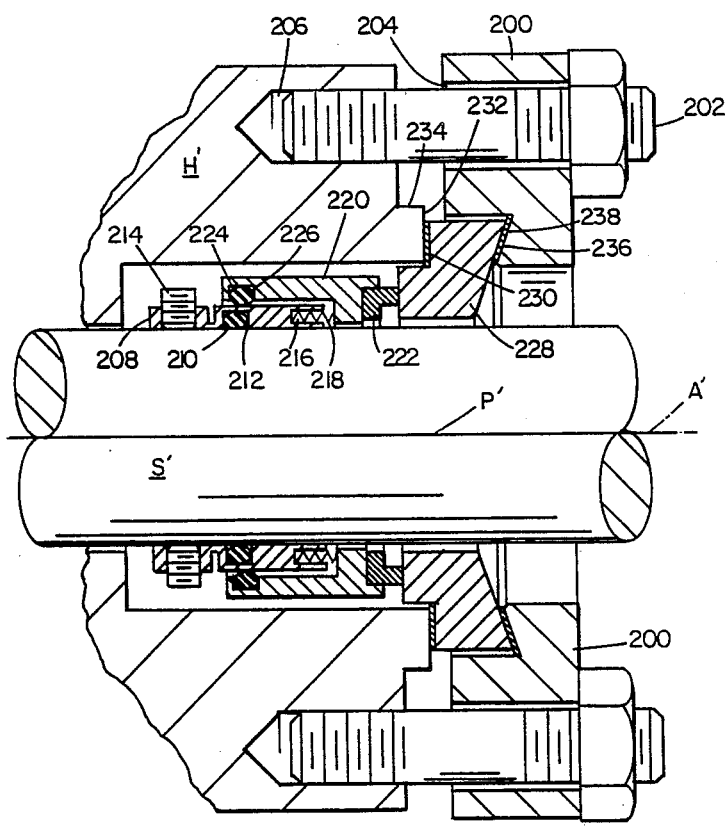
FIG. 5 is a cross-section view similar to FIG. 1 of another embodiment.

FIG. 5 shows a seal ring assembly of a type commonly used in the prior art except that the hard ring and its clamping structure have been altered to conform to the present invention. This embodiment is considerably simpler and less costly to make. It lacks any system for flushing, has only one shaft seal sleeve, and may be used where the different features of FIG. 1 are not needed, suited or desired.

In FIG. 5, the gland 200 is a flange ring which is fixed to housing H to surround the shaft opening therein by bolts 202 extending through openings 204 in the ring into threaded receiving sockets 206 in housing H'. A single sleeve 208, which closely surrounds the shaft S', has a sealing O-ring 210 contained in an annular groove 212 in its radially inner surface to seal the sleeve to the shaft S'. Screws 214 extend through threaded apertures at the inboard end of sleeve 208 to fix the sleeve non-rotatably to the shaft. The outboard end of sleeve 208 is provided with a multiplicity of axial recesses 216 each receiving one end of an individual spring coil 218. The other end of springs 218 bears against the radially inwardly extending flange of annular holder 220 for the resiliently pressed carbon seal ring 222. Holder 220 is sleeved over sleeve 208 and is sealed thereto by O-ring 224 in groove 226 in the inboard end of the inner surface of holder 220.

The hard seal ring 228 loosely surrounds shaft S' and its radially inner part has a radially disposed inboard face engaging a like face on sealing ring 222. The thicker outboard portion of seal ring 228 has a surface 230 disposed in a radial plane and opposed to a like retainer surface 232 on annular projections 234 of housing H' around the opening for the shaft therein. The surface 236 on the opposite side of seal ring 228 from surface 230 is inclined relative to surfaces 230, 232 and opposes inclined retainer surface 238 on gland 200, which is one wall of a V-shaped annular groove in the gland, the other wall of which is spaced radially from the outer face of sealing ring 228. As in FIG. 1, the two pairs of retainer and opposed surfaces 230, 232 and 236, 238 have intervening gaskets. Also, as in FIG. 1, in accordance with the invention, the generatrices of the paired surfaces are substantially concentric on point P' on axis A'.

In the FIG. 5 embodiment, the housing shaft cavity is sealed by O-rings 210, 224, sealing rings 222 and 228 and the gasket between surfaces 230, 232. The radial disposition of surfaces 230, 232 is preferred only. The effects of the invention during expansion/contraction are substantially as explained in connection with FIG. 1. It is noted, however, that gland 200, bolts 202 and projection 234 should have similar coefficients of expansion.

I claim:

1. In a seal assembly for sealing about an axis of rotation having a pair of seal rings mounted for relative rotation about said axis with seal faces thereof in opposed engagement in a plane radial to said axis, resilient means for yieldably pressing a first of said rings longitudinally of said axis against the other and axially fixed clamping means having clamping members at axially opposite sides of the second of said rings providing oppositely directed retainer surfaces annular about said axis, each paired with an opposed substantially parallel surface on the second of the rings to stop its displacement in respective axially opposite directions, said second ring having a substantially different coefficent of expansion from that of said clamping members, the improvement wherein:

each pair of retainer and opposed surfaces is inclined at an acute angle to the other pair with its surface generatrices centered at substantially the same point on said axis as those of the other pair.

2. A seal assembly according to claim 1 wherein the generatrices of said respective pairs of retainer and opposed surfaces are at an angle to each other between about 10° and 40°.

3. A seal assembly according to claim 1 wherein the generatrices of one of said pairs of retainer and opposed surfaces are radial to said axis.

4. A seal assembly according to claim 3 wherein the generatrices for the other said pair of retainer and opposed surfaces are at an angle to the generatrix lines of said one pair of retainer and parallel surfaces of about 20°.

5. A seal assembly according to any of claims 1-4 in which at least one of said pairs of retainer and opposed surfaces is spaced apart by a gasket.

6. A seal assembly according to any of claims 1-4 which includes means for mounting one of said seal rings coaxially on a shaft, and means for mounting the other of said seal rings coaxially of said shaft to a housing having a passage therein into which said shaft extends, said respective mounting means each including sealing means additional to said seal rings for preventing flow of fluid through said passage.

* * * * *